(12) United States Patent
Seba et al.

(10) Patent No.: US 12,006,862 B2
(45) Date of Patent: Jun. 11, 2024

(54) FUEL SUPPLY DEVICE FOR SUPPLYING A FUEL AND INTERNAL COMBUSTION ENGINE

(71) Applicant: Liebherr Machines Bulle SA, Bulle (CH)

(72) Inventors: Bouzid Seba, Riaz (CH); Ulrich Weiss, Villars-sur-Glane (CH); Pierre Gobin, Saignelegier (CH)

(73) Assignee: LIEBHERR MACHINES BULLE SA, Bulle (CH)

( * ) Notice: Subject to any disclaimer, the term of this patent is extended or adjusted under 35 U.S.C. 154(b) by 29 days.

(21) Appl. No.: 17/652,043

(22) Filed: Feb. 22, 2022

(65) Prior Publication Data

US 2022/0268200 A1 Aug. 25, 2022

(30) Foreign Application Priority Data

Feb. 22, 2021 (CH) .................................... 00179/21

(51) Int. Cl.
*F02B 43/12* (2006.01)
*B01D 53/94* (2006.01)
(Continued)

(52) U.S. Cl.
CPC .......... *F02B 43/12* (2013.01); *B01D 53/9431* (2013.01); *F01N 3/0205* (2013.01);
(Continued)

(58) Field of Classification Search
CPC .......... F02B 43/12; F02B 19/10; F02B 29/04; F02B 43/02; B01D 53/9431;
(Continued)

(56) References Cited

U.S. PATENT DOCUMENTS 7,410,714 B1 * 8/2008 Burke ............... H01M 8/04126
429/418
2007/0089716 A1 * 4/2007 Saele ..................... F02M 26/32
60/320
(Continued)

FOREIGN PATENT DOCUMENTS

EP 1342887 A2 9/2003
FR 2941499 A1 7/2010
(Continued)

*Primary Examiner* — Kenneth J Hansen
*Assistant Examiner* — Kelsey L Stanek
(74) *Attorney, Agent, or Firm* — McCoy Russell LLP (57) ABSTRACT

The disclosure relates to a fuel supply device for supplying a fuel to an internal combustion engine comprising: a fuel store for storing a primary fuel; and at least two parallel fuel supply paths that are connected to the fuel store, on the one hand, and to the internal combustion engine, on the other hand, wherein the primary fuel can be supplied from the fuel store to the internal combustion engine by means of the first fuel supply path for the purpose of combustion, and the second fuel supply path has at least one reforming device that reforms the primary fuel supplied from the fuel tank into a secondary fuel, and to supply at least a portion of the produced secondary fuel to the internal combustion engine for the purpose of combustion.

18 Claims, 1 Drawing Sheet

(51) Int. Cl.
*F01N 3/02* (2006.01)
*F01N 3/20* (2006.01)
*F01N 3/28* (2006.01)
*F01N 3/36* (2006.01)
*F02B 19/10* (2006.01)
*F02B 29/04* (2006.01)
*F02B 43/02* (2006.01)
*F02G 5/02* (2006.01)
*F02M 21/02* (2006.01)
*F02M 21/06* (2006.01)
*F02M 25/00* (2006.01)
*F02M 27/02* (2006.01)
*F02M 31/16* (2006.01)
*F02M 37/00* (2006.01)

(52) U.S. Cl.
CPC ......... *F01N 3/2066* (2013.01); *F01N 3/2803* (2013.01); *F01N 3/36* (2013.01); *F02B 19/10* (2013.01); *F02B 29/04* (2013.01); *F02B 43/02* (2013.01); *F02G 5/02* (2013.01); *F02M 21/0206* (2013.01); *F02M 21/0227* (2013.01); *F02M 21/0287* (2013.01); *F02M 21/06* (2013.01); *F02M 25/00* (2013.01); *F02M 27/02* (2013.01); *F02M 31/16* (2013.01); *F02M 37/0064* (2013.01); *F02M 37/007* (2013.01); *F02M 37/0076* (2013.01); *F01N 2610/02* (2013.01); *F01N 2610/04* (2013.01)

(58) Field of Classification Search
CPC .... F01N 3/0205; F01N 3/2066; F01N 3/2803; F01N 3/36; F01N 2610/02; F01N 2610/04; F02G 5/02; F02M 21/0206; F02M 21/0227; F02M 21/0287; F02M 21/06; F02M 25/00; F02M 27/02; F02M 31/16; F02M 37/0064; F02M 37/007; F02M 37/0076
USPC .......................................................... 60/599
See application file for complete search history.

(56) References Cited

U.S. PATENT DOCUMENTS

| 2011/0259285 | A1* | 10/2011 | Michikawauchi ..... F02M 31/18 123/3 |
| 2011/0264355 | A1 | 10/2011 | Iwatani et al. |
| 2011/0283684 | A1* | 11/2011 | Aso ....................... F02D 41/123 60/285 |

FOREIGN PATENT DOCUMENTS

| WO | 2015107972 A1 | 7/2015 |
| WO | 2018185663 A1 | 10/2018 |
| WO | 2020230979 A1 | 11/2020 |

* cited by examiner

FUEL SUPPLY DEVICE FOR SUPPLYING A FUEL AND INTERNAL COMBUSTION ENGINE

CROSS-REFERENCE TO RELATED APPLICATION

The present application claims priority to Swiss Patent Application No. 00179/21 filed Feb. 22, 2021. The entire contents of the above-listed application are hereby incorporated by reference for all purposes.

TECHNICAL FIELD

The disclosure relates to a fuel supply device for supplying a fuel to an internal combustion engine.

BACKGROUND

The switch to a regenerative-based energy economy is being demanded increasingly stridently from a sociopolitical aspect. In addition to the use of such fuels based on biomass that have already been sustainably produced up to a certain proportion for some time and in addition to electromobility that provides the possibility of using regeneratively produced electrical energy at the vehicle side, such fuels that can be synthetically produced by electrical energy exist as a further category. The latter can naturally also be based on regenerative-based electrical energy.

Hydrogen is the best known representatives of such fuels and is at the same time of preeminent technical significance within this category. If the use of resources for the production facilities and the distribution system are neglected, hydrogen can be prepared in a practically climate neutral manner. Hydrogen can be used in mobile fuel cell drives and thus in actually emission free (zero emission) vehicles. But considerably better economic competitiveness with conventional vehicle drives can be achieved by the use of hydrogen internal combustion engines that have extremely low polluting emissions. The physical storage methods of molecular hydrogen have the disadvantage with respect to the storage of gasoline and diesel fuel that the volumetric energy density is considerably lower in the latter and/or that such a storage system is very complex and/or expensive.

An alternative possibility for fuel storage is a so-called material based store. The best known types of such material based hydrogen stores include liquid, organic hydrogen carriers. It is in this respect a chemical compound that contains carbon and to which hydrogen can be supplied during so-called hydrogenation. On a later dehydrogenation, the hydrogen can be released again. Starting from this, hydrogen vehicles have already been developed in which the hydrogen serving as the fuel is chemically bound in another material. A so-called onboard reformation in the vehicle is required for the provision of the hydrogen in its molecular form for the combustion. In the already known solutions, the total fuel taken from the fuel tank passes through this reformation process on its way to use in the internal combustion engine. Depending on the specific reformation process used and on the specific design of the reformation device, different requirements on process energy and required construction space thereby result.

SUMMARY

The object of the present disclosure comprises showing a way, starting from the principle known from the prior art, that considerably reduces the effort in the required onboard reformation.

The object is achieved by a fuel supply device. The object is accordingly achieved by a system and by the method for the fuel supply of an internal combustion engine.

In accordance with the disclosure, it is proposed, in contrast to the onboard reformation already known from the prior art, only to reform a comparatively small proportion of the primary fuel into a secondary fuel by means of an integrated reformation device. The predominant proportion of the fuel is not reformed, i.e. it remains chemically untreated, and is supplied to the internal combustion engine for combustion as the primary fuel. At least some of the first reformate produced while supplying the primary fuel in the reforming device is supplied to the internal combustion machine as the secondary fuel. A dual fuel engine is implemented in this manner, with both types of fuel originating from the common fuel tank. The supply of the secondary fuel provided by means of reformation serves the optimization of the combustion process and/or actually makes the reliable ignition of the primary fuel possible at all. The secondary fuel can in particular acts as a booster during the combustion process. The secondary fuel can also serve to improve the quality of the primary fuel by admixture.

To provide the primary and secondary fuels, it is therefore proposed in accordance with the disclosure to provide a common fuel tank that serves as a common fuel source for at least two different fuel supply paths. The fuel tank is connected via the first fuel supply path to the internal combustion engine to supply the primary fuel contained in the store for the combustion without a chemical treatment of the internal combustion engine. A second fuel supply path comprises the initially already addressed reformation device that chemically treats the primary fuel supplied from the fuel tank, that will be called a primary fuel store in the following text, or in which a chemical splitting takes place and provides a secondary fuel as a first reformate. This secondary fuel is supplied to the internal combustion engine as a secondary fuel downstream of the reformation device.

Provision can be made in accordance with an embodiment that the second fuel supply path enables an infeed of the secondary fuel into the respective combustion chambers of the internal combustion engine, in particular an injection into the respective combustion chambers separate from the primary fuel. The secondary fuel can be supplied to the internal combustion engine as a pilot fuel, and in some embodiments, remaining in a locally restricted partial area of the combustion chamber, and indeed in that partial area in which the energy input of the external ignition device takes place. In this case, a primary ignition can be triggered by means of the secondary fuel within a combustion chamber in which substantially the primary fuel is combusted and that serves as a booster for the triggering of a secondary ignition. The total combustion cycle can be improved overall in this manner and/or the reliable ignition of the primary fuel can only be made possible at all. The triggering of a primary ignition by means of the secondary fuel represents a comparatively high activation energy to trigger the combustion of the primary fuel and therefore provides the possibility of optimizing the air/primary fuel mixture with respect to a balancing of the energy efficiency and of the raw emissions of the internal combustion engine. The quality of the fuel/air mixture, that is not present on a use of only the primary fuel, can equally be correspondingly raised by means of the supply of the secondary fuel with the aim of a certain or high homogenization The secondary fuel does not, however, necessarily have to be ignited within the actual combustion chamber. There is alternatively the possibility of effecting the primary ignition in a region spatially separate from the combustion chamber; more precisely for this case in a region spatially separate from the main combustion chamber. This is conceivable in an embodiment of the internal combustion engine having at least one flushed prechamber ignition system that is called a flushed prechamber for reasons of simplicity in the following. In this case, the second fuel supply path can be suitably designed for the introduction of the secondary fuel into the flushed prechamber. Via a fluid communication between the prechamber and the main combustion chamber, the combustion process triggered in the prechamber can trigger a secondary ignition within the main chamber. In addition, the secondary fuel not yet ignited in the prechamber is injected from the prechamber into the main combustion chamber and there forms ignition centers that are spatially separate from one another.

There is also the possibility that the secondary fuel is mixed with the primary fuel in a small partial homogenization up to a complete homogenization and is combusted within the combustion chamber or the main combustion chamber. A prechamber can also be used in such a system approach, such as a non-flushed prechamber ignition system. It can be achieved by a corresponding location of the supply site of the secondary fuel in the main combustion chamber and the time duration respectively the crankshaft angle range of its supply that a higher proportion of the secondary fuel is contained in the prechamber than in the main combustion chamber.

The non-flushed prechamber ignition system can, for example, be formed by a prechamber spark plug or by a separate prechamber having a conventional spark plug or another external ignition system. The simplification of a non-flushed prechamber will also be used in the following text for a non-flushed prechamber ignition system.

The combustion air ratio lambda can in particular be set to a desired value relatively precisely or even very precisely on the use of a flushed prechamber. Provided that a release of thermal energy that is as high as possible and that is injected into the main combustion chamber in the form of so-called ignition flames is desired in the prechamber, a stoichiometric combustion air ratio (lambda=1) is aimed for. If, in contrast, a comparatively high proportion of fuel from the prechamber that has not yet ignited is injected into the main combustion chamber to form as many ignition centers as possible that are spatially separate from one another there and that are as strong as possible, a fuel surplus (lambda<1) can be provided. Instead of making a constant distinction between combustion chamber and main combustion chamber, only the term combustion chamber is used for better legibility in the following text, and indeed even when it is an internal combustion engine equipped with prechambers.

The first fuel supply path can be configured for a supply of the primary fuel in different manners. It is conceivable that the primary fuel is supplied to an injection system of the internal combustion engine, in particular to a high pressure store of the injection system, by means of the first fuel supply path. The primary fuel can be directly injected into the combustion chambers by means of the injection system. Alternatively, the first fuel supply path could be configured to supply the primary fuel to an intake manifold of the internal combustion engine. If an air/fuel mixer is provided, the first connection path can also communicate therewith.

In accordance with a possible embodiment, the internal combustion engine can be equipped with an exhaust aftertreatment device. The admixture of a reducing agent in the exhaust aftertreatment is known. An approach of the present disclosure comprises providing this reducing agent from the primary fuel store. It is conceivable in this connection to provide the primary fuel in its stored form as a reducing agent. In this case, a further supply path can be provided that, starting from the primary fuel store as the source of the exhaust aftertreatment device, supplies the untreated primary fuel as the reducing agent.

It may, however, be sensible under certain circumstances not to supply the primary fuel to the exhaust aftertreatment as the reducing agent, but rather a reformation product of the reforming device, in particular the first reformate, i.e. the secondary fuel. In this case, the second fuel supply path has at least one branch arranged downstream of the reforming device via which a portion of the secondary fuel can be supplied to the exhaust aftertreatment device. The further supply path could also be expanded by an additional reforming device suitable for the generation of a reducing agent from the primary fuel.

In accordance with an embodiment, at least one secondary fuel store can be provided downstream after the reforming device. A constant pressure level of the secondary fuel during the supply to the internal combustion engine can be at least temporarily provided by means of the secondary fuel store, and indeed independently of the operation of the reforming device. The secondary fuel store can be designed as a pressure store, for example. The integration of a secondary fuel store is in particular sensible when the reforming device does not work or only works with restrictions under certain operating conditions. One example for this is a cold start of the internal combustion engine, for example. Depending on the primary fuel provided for the system in accordance with the disclosure, i.e. on the required chemical reaction and on the surface material of the catalyst in the reforming device, a certain temperature level is required for its start-up. The active surface of the reforming device in particular has to have the required reaction temperature. The thermal requirement is possibly not present directly after the cold start so that the supply with secondary fuel can only take place from the secondary fuel store during this time period. It is also conceivable that the reforming process has to be temporarily deactivated or is not possible at all under certain load conditions of the internal combustion engine. A supply of the internal combustion engine from the secondary fuel store can take place to bridge such a temporary deactivation.

As already indicated above, the secondary fuel can be used as a reducing agent for an exhaust aftertreatment. It may be sensible in this case to use a secondary fuel store as the source for this. The required branching of the second supply path is then arranged downstream after the secondary fuel store.

It is also conceivable to integrate at least one compressor or a pump downstream after the reforming device to raise the secondary fuel to a higher pressure level and to inject it directly into the prechamber or into the combustion chamber of the internal combustion engine. The secondary fuel raised to a higher pressure level by means of a compressor or of a pump is stored within a secondary fuel store, that can then be configured as a pressure store, and is supplied from there into the prechamber or into the combustion chamber of the internal combustion engine. Alternatively or additionally, there is an arrangement such that secondary fuel, where available, can be supplied to the prechamber or to the combustion chamber of the internal combustion engine directly from a compressor or from a pump or from the secondary fuel store.

The primary fuel can be a liquid or gaseous fuel, in particular a low pressure gas. The primary fuel store can be configured as a container for storing a liquid and/or gaseous primary fuel. If the primary fuel is a gaseous fuel, a liquid gas store may be used as the primary fuel store. If the primary fuel is present in liquid form in the primary fuel store, a compression may have already taken place before it possibly changes into the gas phase. In the embodiment of the primary fuel store as a liquid gas store or as a liquid store, at least one fuel conveying pump can be integrated in the interior of the fuel tank primary fuel store. Such a fuel conveying pump may provide a pressure at its top pressure side that considerably exceeds the required pressure level that is required for the fuel conveying up to the internal combustion engine so that a further compression is already achieved in the liquid aggregate state of the primary fuel. The conveying pump particularly may convey at a starting pressure level of at least 50 bar. Optionally, a higher pressure level can be achieved by adding further pumps and/or compressors.

The use of ammonia ($NH_3$) as the primary fuel may be useful since the hydrogen required for the preparation and the process energy required for the hydrogenation can be produced at least predominantly by electrical, in particular regeneratively generated energy. Molecular hydrogen, that should be used as the secondary fuel, can be acquired from ammonia as the first reformate by means of the reforming device. The nitrogen produced as the second reformate during the reforming process can be discharged to the environment after a simple aftertreatment that may be necessary or can in principle be captured in a separate store of the vehicle for a later use. Since the earth's atmosphere has a nitrogen portion of approximately 80%, the former may be used.

In general, a further reformate produced as the first reformate in addition to the secondary fuel can also be stored in an additional storage means that can be attached to the primary fuel store, for example in that a design as a bellow-type tank or piston accumulator is selected. It is equally conceivable to supply the further reformate to the charge air path of the internal combustion engine via an infeed, and indeed may be downstream of the charge air intercooler. This in particular appears possible and sensible in the case of nitrogen as a further reformate.

As already explained above, a certain minimum temperature level of the active surfaces of the reformer or of the integrated catalyst has to be exceeded for the formation process within the second supply path. In addition, the primary fuel supplied to the reforming process should also already have conditioning so that s conversion rate is present that is as high as possible. A conversion rate of 1 to 100% would mean, in the case of a use of ammonia as the primary fuel, that pure hydrogen is available as the first reformate and thus as the secondary fuel and the second reformate is pure nitrogen. In the system in accordance with the disclosure, at least one agent for conditioning the primary fuel may be integrated before the supply to the reforming device. A preheating can in particular be required or at least very useful. Provision is made for this case to integrate at least one heat exchanger upstream before the reforming device to raise the primary fuel flowing through its primary side to a desired temperature level or at least in its direction or beyond this temperature level. Gas or liquid can be conducted through the secondary side of the heat exchanger as a heat carrier. It is conceivable, for example, that the heat exchanger is flowable through the liquid coolant or through another heat carrier of the internal combustion engine. It is also conceivable that the thermal power supplied on the secondary side of a heat exchanger is taken from the exhaust gas. A portion of the engine exhaust gas can in particular be conducted through the secondary side of the heat exchanger, with the portion already being led out from the actual exhaust gas path upstream of the exhaust aftertreatment system or even already upstream of the turbine of the exhaust turbocharger. Due to the comparatively small amount of the secondary fuel flowing in the second connection path, the exhaust gas volume removed from the exhaust line is comparatively small so that no or only insignificant performance losses occur in the exhaust aftertreatment and/or in the charge air compression by means of a turbocharger.

Provision can equally be made that the reforming device has an integral heating element to thermally heat the active surfaces of the integral catalyst. Alternatively or additionally, the reforming device can also have an exhaust gas supply line to supply a partial volume flow of the exhaust gas of the internal combustion engine to the reforming device. The exhaust gas flowing through the reforming device produces a thermal heating of the surfaces of the integral catalyst so that the total reforming process is set in motion or runs at a higher conversion rate. Said partial volume flow can here already be led out of the actual exhaust gas path upstream of the exhaust aftertreatment device or even already upstream of the turbine of the exhaust gas turbocharger. Due to the comparatively small amount of the secondary fuel and the small-dimensioned reforming device associated therewith, the branched partial volume flow of the engine exhaust required for it is comparatively small so that no losses are thereby to be expected with an internal combustion engine charged by means of an exhaust gas turbocharger and/or with the exhaust aftertreatment.

The exhaust gas amount flowed through the reforming device and/or through the secondary side of said heat exchanger to preheat the primary fuel can be supplied to the internal combustion engine without a downstream treatment of the charge air; in particular no further cooling of this partial exhaust gas flow is required since this amount is comparatively small in comparison with the charge air amount and so no real temperature increase of the air led into the combustion chambers is present.

As already previously indicated multiple times, the mass flow of the secondary fuel supplied to the internal combustion engine is considerably smaller than the mass flow of the primary fuel. In the rated operation of the internal combustion engine, a ratio between the primary fuel and the secondary fuel is possible here, for example, with respect to their energy inputs, of at least 10:1 and up to 50:1.

The fuel supply device can furthermore be provided with a unit that is configured to determine an optimum admixture rate of the secondary fuel to the primary fuel to be supplied into the combustion chamber of the internal combustion engine. The determination of the admixture rate takes place, for example, on the basis of a stored parameterization and/or modeling. The optimum admixture rate is in particular dependent on the current operating conditions of the total system so that the current operating state of the combustion process in the internal combustion engine and/or the state of the exhaust aftertreatment system is, for example, taken into account for the determination of the optimum admixture rate. Detecting the quality of the primary fuel is also conceivable. The current operating conditions and other parameters may be measured or determined from one or more sensors in the system. After fixing the optimum admixture rate, a control unit that can in turn comprise a plurality of controllers and regulators can implement this by way of actuators.

In addition to the fuel supply device in accordance with the disclosure, the present disclosure equally relates to a system or to a mobile stationary work machine or to a vehicle comprising a fuel supply device in accordance with the present disclosure, an internal combustion engine, and optionally an exhaust aftertreatment device. The advantages and properties of the system in accordance with the disclosure having the fuel supply device in accordance with the disclosure were already shown above in detail so that a repeat description will be dispensed with at this point.

The object set for the present disclosure is also achieved by the corresponding method for the fuel supply in which a chemically untreated primary fuel is supplied to an internal combustion engine as the main fuel. Some of the available primary fuel is reformed by means of a reforming device into a secondary fuel that is supplied to the internal combustion engine as a pilot fuel. Advantages of the method in accordance with the disclosure correspond to those of the fuel supply device in accordance with the disclosure. The method in accordance with the disclosure can in particular be carried out by means of a fuel supply device in accordance with the present disclosure.

Provision can be made in accordance with an embodiment of the method that the admixture rate is variable in engine operation and that a continuous adaptation is provided under changing conditions. Provision can in particular be made that an optimum admixture rate of the secondary fuel to the primary fuel to be supplied into the combustion chamber of the internal combustion engine is determined. The determination of the admixture rate takes place, for example, on the basis of a stored parameterization and/or modeling. The optimum admixture rate is in particular dependent on current operating conditions of the total system so that the current operating state of the combustion process in the internal combustion engine and/or the state of the exhaust aftertreatment system and/or the quality of the primary fuel is/are, for example, taken into account for the determination of the optimum admixture rate. After fixing the optimum admixture rate, a control unit that can in turn comprise a plurality of controllers and regulators can implement this by way of actuators.

BRIEF DESCRIPTION OF THE FIGURES

Further advantages and properties should be described in more detail with reference to FIG. 1, with FIG. 1 showing embodiments and options of the disclosure.

DETAILED DESCRIPTION

Figure 1:
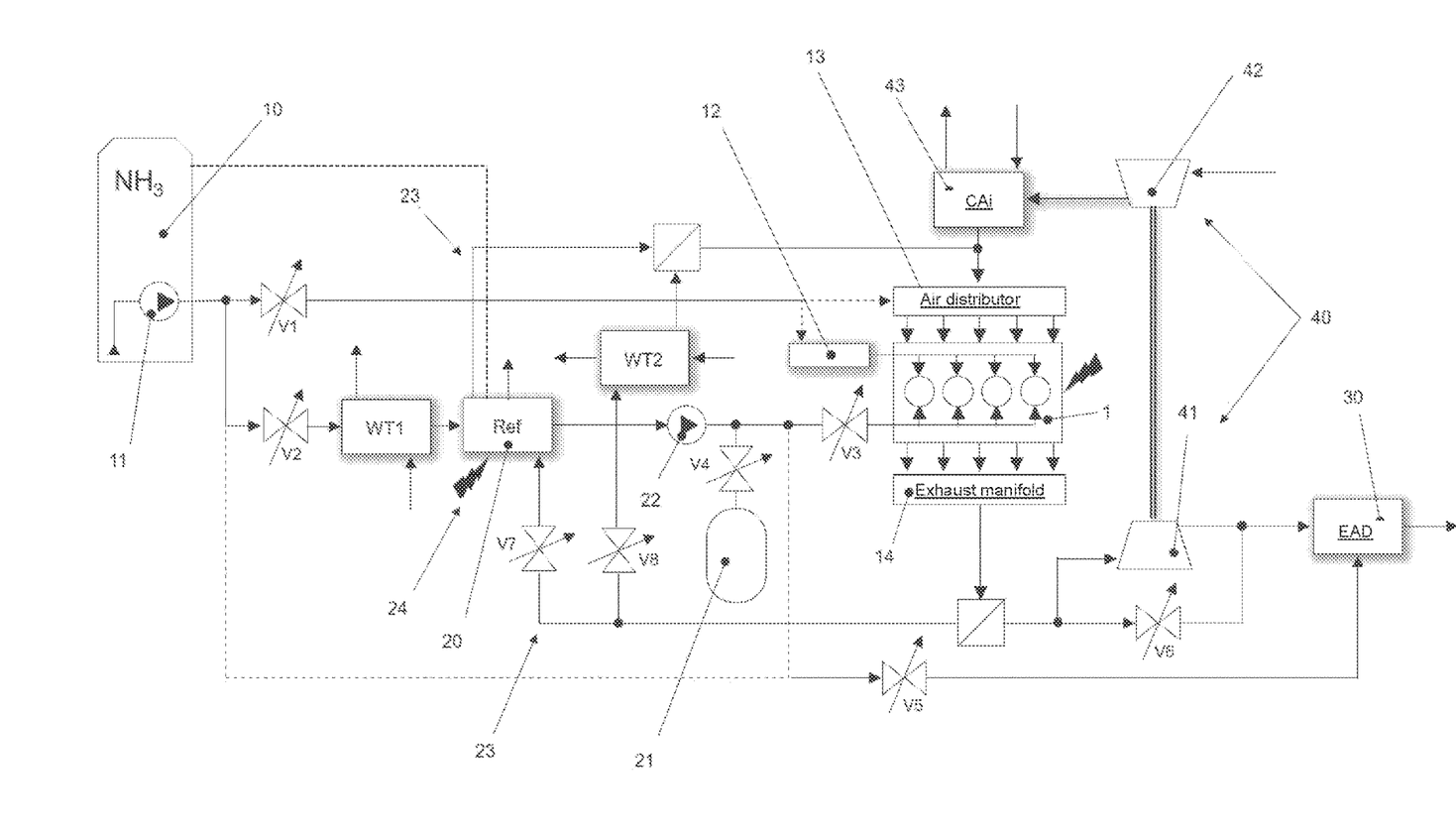
FIG. 1 shows a circuit diagram of an embodiment of the system in accordance with the disclosure comprising the fuel supply device and the supply device in different variations without intending to be exclusive. The arrows present in the circuit diagram indicate the flow directions of mass flows. Continuous lines symbolize the connections present for every variation, whereas interrupted lines represent optional alternative variations. It should already be mentioned by way of anticipation that the presence of an exhaust gas turbocharger 40 is optional. At the heart of the disclosure, a presence of an exhaust aftertreatment device 30 is likewise optional.

A gaseous or a liquid fuel is supplied to the primary fuel store in the fueling procedure, that is not to be looked at in any more detail here. This fuel will be called the primary fuel in the following text. The primary fuel may be a liquid fuel or a low pressure gas. If the primary fuel store 10 is a liquid or a liquid gas store, a first compression of the primary fuel to be taken or just taken from the primary fuel store 10 may take place in its liquid aggregate state. This particularly may take place via a conveying pump 11 that accordingly provides a pressure on its top pressure side that is substantially higher than is required for conveying the primary fuel, and indeed at a pressure level of at least 50 bar. If the primary fuel store 10 is a liquid or a liquid gas store, the conveying pump 11 may very particularly be integrated in the interior of the primary fuel store. The addition of further pumps (not shown here) is also possible to achieve or even further increase the desired pressure level.

The use of $NH_3$ (ammonia) as the primary fuel that has a volumetric energy density of 3.2 kWh/l at a pressure of approximately 9 bar and a temperature of approximately 15° C. It must be mentioned with respect to the measurability that only a volumetric energy density of 1.3 kWh/l is present, and 10 kWh/l for diesel fuel (15° C.) for the storage of molecular hydrogen below 700 bar (15° C.).

In every embodiment of the disclosure, the forwarding of the provided primary fuel takes place via at least two parallel fuel supply paths. The primary fuel taken from the primary fuel store 10 is supplied in a chemically unchanged form via a first path to the internal combustion engine 1, for example into a high pressure store 12 of a fuel injection system (drawn as a variant in FIG. 1), from where the primary fuel is injected directly into the respective combustion chambers of the internal combustion engine 1. Alternatively, the primary fuel can also be supplied into the intake pipe 13 (drawn as a variant) or into an air/gas mixer (not drawn). The optional regulation valve V1 regulates the volume flow of the primary fuel to the internal combustion engine 1.

The primary fuel is conducted via the second one of these at least two parallel paths through a so-called reformer 20. The separation of molecular hydrogen from the primary fuel takes place therein. This molecular hydrogen or a portion thereof is supplied to the internal combustion engine 1. The volume flow to the reformer 20 can be set by means of the valve V2.

Optionally, as indicated by the dashed line in FIG. 1, a third parallel path can exist that starts from the primary fuel store 10 and via which the primary fuel is supplied serving as the reducing agent directly or indirectly to the exhaust aftertreatment device 30. If the primary fuel is, for example, ammonia ($NH_3$), alternatively to its direct use as a reducing agent, an indirect use is also possible in that—as indicated by the corresponding dashed line—molecular hydrogen produced by the reformation is used as the reducing agent. As a further alternative, primary fuel could be used indirectly as the reducing agent along said third parallel path via a separate reformer (not drawn). An integrated control valve V5 swerves the setting of the volume flow either from the primary fuel store 10 or from the secondary fuel store.

Independently of whether reducing agent is obtained via the reformer 20 or not, an embodiment of the system in accordance with the disclosure does not provide any reducing agent use or, in this embodiment, obtains its reducing agent from a separate tank or from a separate reformer, for instance, arranged in the third parallel path, the system in accordance with the disclosure may include a secondary fuel store 21 that may particularly be designed as a pressure store that can obtain molecular hydrogen from the reformer 20 and from where molecular hydrogen can be supplied to the internal combustion engine 1. The secondary fuel store 21 can be connected via a further valve V4. The volume flow of the secondary fuel from the reformer 20 or from the secondary fuel store 21 to the internal combustion engine can be set by means of the optional valve V3.

If the exhaust aftertreatment device 30 provides the obtaining of molecular hydrogen released above the reformer 20 as the reducing agent, the system in accordance with the disclosure may include a store that can obtain molecular hydrogen from the reformer 20 and from where molecular hydrogen can be supplied to the exhaust aftertreatment device 30. It may particularly be a common store from which molecular hydrogen can be supplied to the internal combustion engine 1 and to the exhaust aftertreatment device 30 (cf. FIG. 1) and which very particularly may be designed as a pressure store.

The presence of such an arranged secondary fuel store 21 or of a secondary fuel store 21 arranged for common use has the advantage that sufficient molecular hydrogen can also be temporarily provided even when the reformer 20 cannot release sufficient or any molecular hydrogen, e.g. on an engine start-up and during the engine operation before the reaching of the operating temperature of the reformer 20.

The presence of stored molecular hydrogen has the advantage that it is immediately available on a desired engine start-up and does not first have to be produced. Furthermore, the required hydrogen contained in the primary fuel could be reformed using waste engine heat in the normal case, i.e. it could be provided energetically more efficiently than by an online production with an internal combustion engine 1 that has cooled down and in which the thermal power required in the reformer 30 would have to be expended with a direct additional energetic consumption. With a correspondingly large supply in the secondary fuel store 21, such energetically more efficiently reformed molecular hydrogen can be provided to the internal combustion engine 1 for so long until the internal combustion engine 1 in turn can provide a sufficiently high thermal exhaust gas energy and has already furthermore primarily covered the thermal power requirement of the turbine 41 of the turbocharger and of the exhaust aftertreatment system 30.

The system in accordance with the disclosure may have at least one compressor 22 so that the hydrogen released by the reformer 20 can be supplied to the internal combustion engine 1, to the secondary fuel store 21, and/or to the exhaust aftertreatment device 30 at an elevated pressure. In the embodiment, the combustion chambers of the internal combustion engine 1 respectively have a prechamber to which the molecular hydrogen is supplied. With respect to the energy content, the amount of he supplied primary fuel in rated operation of the internal combustion engine 1 is approximately 50 times as large as that of the molecular hydrogen supplied to the prechambers. The reformer 20 of the system in accordance with the disclosure can accordingly be orders of magnitude smaller than a reformer that provides the total fuel requirement of a comparable internal combustion engine 1.

The temperatures of the active surfaces of the catalyst and the primary fuel coming into contact therewith have to be sufficiently high so that a release of the molecular hydrogen from the supplied primary fuel can take place in the reformer 20, and indeed with a sufficiently high conversion rate. In the embodiment, thermal energy from the exhaust gas of the internal combustion engine 1 is supplied to the reformer 20. A partial exhaust gas stream 23 may be fed to the reformer 20 here, with this partial exhaust gas flow 23 already being taken upstream of the turbine 41 of the exhaust gas turbocharger 40, i.e. as directly as possible at the exhaust manifold 14. The valve V7 serves the setting/regulation of the volume flow taken from the exhaust manifold 14.

The partial exhaust gas flow 23 extending through the reformer 23 and the fuel path naturally have to be hermetically separated from one another. For instance, the active surfaces of the catalyst can, for example, be applied to a carrier material that is connected via a high thermal conductivity to the wall surfaces of the channel or channel system flowed through by exhaust gas.

Since only a comparatively small amount of molecular hydrogen is required with respect to the engine power in the system in accordance with the disclosure and since the reformer 20 can be designed as correspondingly small, the exhaust gas mass flow required to heat the reformer 20 is a great deal smaller than the mass flow of the charge air coming from the charge air intercooler 43 so that the partial exhaust gas flow 23 flowing through the reformer 20 can be mixed to the charge air path without problem thermodynamically even if actually no exhaust gas recirculation is desired for technical combustion reasons. The further cooling down of the partial exhaust gas flow 23 to a temperature level that approximately corresponds to that of the charge air at the inflow site is furthermore also not necessary. The inflow site of the partial exhaust gas flow into the charge air path may be located downstream of the charge air intercooler 43. At the same time, the exhaust gas energy amount taken from the turbine 41 of the exhaust gas turbocharger 40 is so low that no noticeable reduction is shown in the efficacy of the charging of the internal combustion engine 1, in particular also not in the so-called turbo lag, i.e. a transient increase of the charge moment of the internal combustion engine 1 at a low crankshaft speed. On the presence of said secondary fuel store 21 and of a then present corresponding stock amount, the hydrogen reformation can be temporarily halted at a low crankshaft speed of the internal combustion engine 1 and the total exhaust gas amount can consequently be provided to the turbine 41. Additionally or alternatively, thermal energy can be otherwise supplied to heat the reformer 20, e.g. by an optional electric heating 24.

Furthermore a conditioning of the primary fuel can be sensible or necessary upstream of the reformer 20, e.g. the raising or lowering to a certain pressure level and/or a temperature increase to a certain level or in the direction of a certain level, etc. As representative for this, the embodiment shows a heat exchanger WT1 that is flowed through by the primary fuel, with the temperature circuit of the secondary side of the heat exchanger WT1 only being indicated. In principle, heated engine coolant or waste exhaust heat can be supplied to the secondary side, e.g. also via an intermediate circuit that obtains its heat via a heat exchanger (not drawn) installed in the exhaust gas path, for example downstream of the exhaust aftertreatment device 30. Said conditioning of the primary fuel to the reformer 20 can naturally also take place over a plurality of stages, e.g. a cascade of heat exchangers WT1 along the second fuel supply path between the primary fuel store 10 and the reformer 20. The secondary side of the heat exchanger WT1 can in particular be arranged downstream from the secondary side of the heat exchanger (not drawn) integrated in the heat reformer. With such an arrangement, the partial exhaust gas flow 23 may move from the outlet of the secondary side of the heat exchanger WT1 into the charge air path.

The system in accordance with the disclosure optionally has a further or the actual exhaust gas recirculation that extends over the EGR valve V8 and an EGR intercooler WT2.

Two so-called reformates are produced on the reformation of the primary fuel. The first reformate can ideally be pure hydrogen and the second reformate is ideally a substance that is free of hydrogen and at least generally no longer satisfies any direct chemical function in the system in accordance with the disclosure. As mentioned, on a use of $NH_3$ as the primary fuel the second reformate is nitrogen. In the system in accordance with the disclosure, however, a use of the thermal energy of the second reformate is possible. Such a primary fuel can be used in which the second reformate is again a starting material for the reproduction of the primary fuel, with this reproduction naturally requiring an introduction of external energy and as a rule taking place outside the vehicle in which the system in accordance with the disclosure is used.

Depending on the primary fuel and depending on the materials of the active layer of the catalyst contained in the reformer 20, a certain pressure level and above all the reaching of a certain temperature are required to achieve a high conversion rate. Outside suitable operating conditions—in particular on a cold start and in the operating phase of the internal combustion engine directly following it—there is a comparatively high slip of the primary fuel on the operation of the reformer 20, which naturally damages the system efficiency and possibly at least requires an additional measure along that path that should actually ideally only be flowed through by the second reformate. In the event that the second reformate is accompanied by a slip of the primary fuel and the second reformate may be output to the environment at a corresponding purity and this is desired, a corresponding aftertreatment is required as the measure. With an existing risk of the conditioning of the reformer 20 and of the supplied primary fuel not securing a degree of purity of the first reformate respectively of the secondary fuel and/or of the second reformate sufficiently high for the intended use at all times, the system in accordance with the disclosure should be equipped with said secondary fuel store 21. The secondary fuel can then be obtained from the store 21 on an interim basis, said store 21 being able to be filled up again later on a presence of correspondingly suitable operating conditions.

On a reaching of the operating temperature of an internal combustion engine 1 provided for the system in accordance with the disclosure and if it is designed as a hydrogen engine, for example, the exhaust gas temperatures in the area of the exhaust manifold 14 are in an order of magnitude of 600° C. to 900° C. For $NH_3$, the already mentioned example of a primary fuel, a conversion rate of approximately 95% is already reached with a reformer 20 whose active surface consists of ruthenium at temperatures of 550° C., i.e. an $NH_3$ slip of 5% remains; at a temperature of 600° C., the first reformate is practically pure hydrogen. A temperature of 650° C. is required to achieve such a conversion rate when using less expensive materials, e.g. a nickel platinum alloy or a nickel palladium alloy.

$NH_3$ is not least a primary fuel because the second reformate is nitrogen and its emptying to the environment is permitted and harmless since atmospheric air comprises approximately 79% nitrogen. The second reformate can be present upstream of its discharge from the system in accordance with the disclosure via a device to reduce the $NH_3$ slip that may be present (not drawn), e.g. an oxidation catalyst. The equipping of the oxidation catalyst with a heating device to which external energy is supplied as required since comparatively low temperatures during the reformation are the cause of a comparatively high $NH_3$ slip.

Such primary fuels in which the second reformate is not discharged to the environment can be used by corresponding adaptations using the system in accordance with the disclosure. In such a case, the system in accordance with the disclosure is equipped with a further store (not shown) to which the second reformate or optionally an end product converted therefrom by means of an aftertreatment is supplied. An emptying of that store is naturally then necessary in addition to a filling of the primary fuel store 10.

In an embodiment, the second reformate or said end product is so-to-say stored at the same location at which the primary fuel has been stored directly beforehand, which is possible, for example, by the use of a bellow-type tank or of a piston store. This basic principle represents an optimum improvement of the system in accordance with the disclosure to use specific primary fuels. If, however, only the prechambers are supplied with the secondary fuel while the combustion chambers are only supplied with the primary fuel, the proportionality for the increased effort of a bellow-type tank or of a first piston accumulator instead of a small separate tank would probably not be economic for cost reasons due to the small amount of the second reformate that is produced. In another embodiment of the system in accordance with the disclosure in which a mixture of molecular hydrogen with the primary fuel is provided for common combustion, correspondingly greater amounts of the second reformate can arise and the additional effort of a bellow-type tank or of a piston accumulator can therefore have a positive effect, for example on the installation capability of the system in accordance with the disclosure in a vehicle; in particular when it is a vehicle having a restricted volume for the installation, for example a road vehicle or a mobile work machine.

The system in accordance with the disclosure can naturally be operated purely from a technical aspect independently of whether a suitable primary fuel has been produced from a fossil resource or on a regenerative base. However, the desired use of the system in accordance with the disclosure provides the use of regeneratively generated primary fuel or at least that the production is predominantly regeneratively based. It must be mentioned at this point that methane is not necessarily natural gas, i.e. is not necessarily a fossil resource. There has in the meantime also been an availability of regeneratively produced methane ($CH_4$) without the use of biomass due to the long known possibility of producing the required hydrogen ($H_2$) by means of electrolysis and to the synthetic hydrogenation of carbon dioxide ($CO_2$) that has been able to be carried out in the meantime. It can consequently be assumed that correspondingly longer chain CH molecules will become synthetically producible on a regenerative base in the foreseeable future that have the advantage of a higher volumetric energy density and that can be used in the system in accordance with the disclosure that has to be correspondingly adapted.

In an embodiment, the hydrogen admixture rate of the fuel components, i.e. the primary fuel and the hydrogen, supplied into the combustion chamber can be varied during engine operation, which particularly can take place via corresponding software in which corresponding parameterizations and/or modeling results are stored whereby a respective optimum hydrogen admixture rate is determined that is then implemented via actuation. The change of a hydrogen admixture rate of the fuel components supplied into the combustion chamber provides the possibility of a partial onboard compensation of deficits of the fuel quality that may be present (see below) that is available at the system limit:

If the constellation of the instantaneous temperatures or of the temperatures to be expected in the near future of the engine exhaust gas and of active surfaces of the exhaust aftertreatment device give rise to the expectation that at least one specific emission limit value could be exceeded or will be exceeded, the fuel composition supplied to the combustion chamber can already be proactively changed to compensate an instantaneous deficit of the efficacy of the exhaust aftertreatment device 30 with respect to the system emissions (for example, the emissions of a vehicle). A reduction of the raw emissions or a scaling effect of the exhaust aftertreatment device 30 can optionally be achieved by this possibility in accordance with the disclosure without impairing the speed/torque working point of the internal combustion engine 1. If the internal combustion engine 1 has to be operated comparatively rarely in the working range of maximum and approximately maximum emissions in an application in order, for example, to be able to provide briefly occurring maximum powers and in so doing at least one component of the exhaust aftertreatment device 30 would have to be configured only to cover this comparatively rarely occurring operation situations in the next higher dimension, it may be useful in sum to dispense with the latter and to compensate an instantaneous deficit of the efficacy of the exhaust aftertreatment device 30 during such operating situations with an additional hydrogen consumption with respect to the system emissions.

If a certain decrease in the efficacy of the exhaust aftertreatment device 30 has already been detected or predicted and if an instantaneous system halt to carry out a service is particularly unfavorable because certain work should be ended beforehand, etc., the same operating strategy could likewise be used so that continued work is possible while observing the emission limit values.

As has already been mentioned above, the secondary fuel can alternatively also be injected directly into the combustion chamber instead of into a possible prechamber of the internal combustion engine. A separate supply of the molecular hydrogen into the combustion chamber is sensible for this purpose, and indeed in the near zone of a primary ignition event that can be triggered from outside. The supply of the molecular hydrogen may take place comparatively close to the ignition time of the ignition device. The comparatively small energy input of the primary ignition thus increasingly takes place in that partial volume of the combustion chamber in which hydrogen is increasingly available for the oxygen present as a reaction partner. If the ignition temperature of hydrogen is still exceeded, considerably smaller energy portions with respect to the oxygen presence are also sufficient with an extreme hydrogen surplus to trigger the combustion of hydrogen than is the case for triggering a combustion of the primary fuel. As soon as a certain quantity of the hydrogen combustion has been triggered, a comparatively high activation energy is ready to inflame the primary fuel. With respect to the energy content, the amount of the supplied primary fuel in rated operation of the internal combustion engine is approximately 10 times as large as that of the supplied hydrogen.

An advantage of this embodiment is a saving of the prechamber and the possibility that the usable hydrogen quantity can be varied within certain limits as an additional degree of freedom of the combustion (see below). If in contrast there is the endeavor for a hydrogen consumption that is as low as possible (see below), the ability of the hydrogen to serve as a booster is used considerably better while using a prechamber having its own hydrogen supply, i.e. a flushed prechamber.

A further alternative embodiment provides an enriching of the primary fuel with hydrogen. In this respect, the primary fuel and the molecular hydrogen produced online by means of reformation, to which a buffer store is optionally provided, are together supplied to a combustion chamber, for example via a common high pressure fuel injection, via an intake pipe injection 13 or a combination already takes place before or in an air/gas mixer. In all these variants, the admixture of the molecular hydrogen serves for influencing the combustion gas/air mixture properties, whereby an improved ignition capability can be present and an increased efficiency can result and/or a lowering of the exhaust gas raw emissions.

An increase of the proportion of molecular hydrogen in the fuel mixture enables an increase of the combustion air ratio lambda, which produces an increase in efficiency. The internal combustion engine 1 can also be operated at a very great increase of the combustion air ratio in which finally smaller NOx emissions are present due to a correspondingly great enriching of the fuel by molecular hydrogen. Optionally, the combustion chambers of the internal combustion engine 1 can be equipped with a non-flushed prechamber for example in the embodiment of a prechamber spark plug. Such a measure produces an increased effort on the one side, but on the other side enables a saving of hydrogen while maintaining the combustion air ratio, whereby a smaller reformer can be used under certain circumstances.

The system in accordance with the disclosure may be used in vehicles or in mobile work machines. The use within stationary systems is, however, equally possible, e.g. for a genset use, where an energy carrier suitable as a primary fuel in the sense of the disclosure is available so-to-say as a fluid. In this respect, the disclosure can serve the use of fuels (in particular so-called lean gases such as sewer gas, landfill gas, etc.) that cannot otherwise be used due to their low quality and even enter as greenhouse gases into the earth's atmosphere unused from an energetic aspect in a particularly unfavorable case. If a continuous inflow of the primary fuel to the system in accordance with the disclosure is ensured, a primary fuel store 10 for buffering for the primary fuel can be dispensed with. In accordance with the disclosure, some of the primary fuel is supplied to a reformer 20. A fuel purification may have to take place upstream of the reformer 20, for example because the primary fuel has contaminants. If a primary fuel store 10 for buffering for the primary fuel is present, a fuel purification may take place before the entry into the primary fuel store 10 or before the entry into the storage volume within the primary fuel store 10. In the observation plane of a circuit diagram, there are no further differences on the use of the system in accordance with the disclosure in a mobile and stationary applications. The embodiment of the disclosure may be used for the stationary use for the use of primary fuels of low quality in which the molecular hydrogen split off from the primary fuel is used in a prechamber.

The advantages of the disclosure can once again be summarized as follows:

Reducing the process energy for the onboard preparation of the primary fuel; the high temperature for the dehydrogenation in the reformer 20 can be obtained from the exhaust gas that is taken directly at the exhaust manifold 14. Since the exhaust gas amount is comparatively small, there is first still a sufficiently high exhaust gas energy available to supply the turbine 41 of the turbocharger 40 and the efficacy of the exhaust aftertreatment device 30 and second this exhaust gas amount does not have to be aftertreated in a further separate exhaust aftertreatment device, but this exhaust gas amount can rather again be supplied to the charge air path.

Since in the system in accordance with the disclosure only a certain portion of the primary fuel is conducted through the reformer 20 or runs through the reformation process, while the higher portion of the primary fuel is directly utilized by the internal combustion engine 1, the amount of the second reformate, i.e. the separation product of the reformer for which no further use exists onboard is considerably lower. (N.B.: The separation product is typically not waste, but rather recyclable carrier medium that is removed during the next refilling procedure.) A substantially smaller intake capacity for accepting the second reformate is consequently sufficient.

Only a single fuel has to be filled.

The fuel quality can be increased by the mixing of hydrogen into the primary fuel, which can result in the increase of the efficiency and/or in a reduction of the raw emissions.

... or even critical for a primary fuel only being able to be used as such at all.

With a corresponding design of the internal combustion engine 1 (i) the equipping of the main combustion chambers with a respective prechamber or (ii) a correspondingly positioned and aligned separate injection, a particularly ignitable fuel can be used with hydrogen to trigger a secondary ignition.

The system in accordance with the disclosure can be equipped for the removal of the nitrogen oxides with such a catalyst in which hydrogen can be used as the reducing agent. The manual supply of the reducing agent as a further operating material can be dispensed with in this manner. Fuels can be used that can simultaneously take over the function of the reducing agent.

REFERENCE NUMERAL LIST

Internal combustion engine 1
Primary fuel store 10
Fuel conveying pump 11
High pressure fuel injection system 12
Air distributor 13
Exhaust manifold 14
Reformer 20
Secondary fuel store 21
Compressor 22
Partial exhaust gas flow 23
Electric heating 24
Exhaust aftertreatment device 30
Turbocharger 40
Turbine 41
Compressor 42
Charge air intercooler 43
Valves V1, V2, V3, V4, V5, V7,
Wastegate V6
EGR valve V8
Heat exchangers WT1, WT2

The invention claimed is:

1. A fuel supply device for supplying a fuel to an internal combustion engine comprising:
a fuel store for storing a primary fuel;
and at least two parallel fuel supply paths that are connected to the fuel store, and to the internal combustion engine, wherein
the primary fuel can be suppled from the fuel store to the internal combustion engine by means of a first fuel supply path for the purpose of combustion; and
a second fuel supply path has at least one reforming device by means of which the primary fuel supplied from the fuel store is reformable into a secondary fuel and at least a portion of the secondary fuel can be supplied to the internal combustion engine for the purpose of combustion,
wherein a secondary fuel store for storing the reformed secondary fuel is provided and/or at least one compressor/pump is included downstream after the reforming device to be able to supply the reformed secondary fuel at an elevated pressure to at least one of the internal combustion engine, the secondary fuel store, and an exhaust aftertreatment device, and
wherein the second fuel path has at least one branching downstream after the reforming device to be able to provide the reformed secondary fuel as a reducing agent to an exhaust aftertreatment system, with the secondary fuel being able to be provided to the exhaust aftertreatment system directly by the reforming device and/or from the secondary fuel store.

2. The fuel supply device in accordance with claim 1, wherein the secondary fuel can be supplied to the internal combustion engine as a pilot fuel, remaining in a locally restricted partial region of a combustion chamber or of a prechamber of the internal combustion engine while forming a stoichiometrically balanced secondary fuel air ratio or while forming a surplus of the secondary fuel, i.e. a lambda value smaller than or considerably smaller than 1.

3. The fuel supply device in accordance with claim 1, wherein the primary fuel can be supplied to an injection system of the internal combustion engine and/or to an intake pipe of the internal combustion engine and/or to an air/fuel mixer by means of the first supply path.

4. The fuel supply device in accordance with claim 1, wherein at least a third fuel supply path is provided that connects the primary fuel store to an exhaust aftertreatment device to supply the primary fuel in an untreated state or reformed as a reducing agent by means of an additional reforming device integrated in the third fuel supply path.

5. The fuel supply device in accordance with claim 4, wherein an exhaust gas supply line is provided via which a partial exhaust gas flow of the generated exhaust gas of the internal combustion engine can be conducted through the reforming device to heat active surfaces of an integrated catalyst and/or through the secondary side of the heat exchanger present upstream of the reforming device.

6. The fuel supply device in accordance with claim 5, wherein the removal of the partial exhaust gas flow takes place at or directly downstream of an exhaust manifold of the internal combustion engine upstream of the exhaust aftertreatment device and upstream of a turbine of an exhaust gas turbocharger.

7. The fuel supply device in accordance with claim 5, wherein the partial exhaust gas flow conducted through the reforming device and/or the secondary side of the heat exchanger is conducted into a charge air path of the internal combustion engine downstream of a charge air intercooler of the charge air path.

8. The fuel supply device in accordance with claim 7, wherein the fuel supply device and/or the reforming device has/have at least one additional storage means for storing at least one additional further reformate produced from the primary fuel, with the storage means being a component of a primary fuel store designed as a bellow-type tank or a piston accumulator and/or with the reforming device providing an infeed to supply the further reformate to the charge air path downstream of the charge air intercooler of the charge air path.

9. The fuel supply device in accordance with claim 1, wherein the primary fuel is stored or storable in the primary fuel store in liquid form or in gaseous form, with it being a liquid gas, stored in the primary fuel store and/or with the reformed secondary fuel being molecular hydrogen.

10. The fuel supply device in accordance with claim 9, wherein means for compressing the primary fuel present in liquid form are provided with the primary fuel stored as a liquid gas, in the form of a pump that simultaneously acts as a primary fuel conveying pump and that is integrated in the fuel store.

11. The fuel supply device in accordance with claim 9, wherein at least one means for conditioning the primary fuel for subsequent reformation, in the form of a heat exchanger, is integrated upstream of the reforming device, for optimizing a temperature level of the primary fuel and/or for adapting a pressure level of the primary fuel.

12. The fuel supply device in accordance with claim 11, wherein the at least one means for conditioning the primary fuel for subsequent reformation is in the form of a compressor or of a conveying pump or of a pressure reducer.

13. The fuel supply device in accordance with claim 9, wherein the liquid gas is ammonia.

14. The fuel supply device in accordance with claim 1, wherein the fuel supplied to the internal combustion engine has a ratio between the primary fuel and the secondary fuel in rated operation with respect to its energy content of at least 10:1 up to 50:1.

15. A fuel supply device comprising a control unit configured to determine an optimum admixture rate of a secondary fuel to a primary fuel to be supplied into a combustion chamber of an internal combustion engine on the basis of stored parameterizations and/or modeling results, with the fuel supply device being equipped with at least one corresponding actuator to enable an implementation of the optimally determined admixture rate of the secondary fuel,
    wherein a secondary fuel store for storing the reformed secondary fuel is provided and/or at least one compressor/pump is included downstream after the reforming device to be able to supply the reformed secondary fuel at an elevated pressure to at least one of the internal combustion engine, the secondary fuel store, and an exhaust aftertreatment device, and
    wherein the second fuel path has at least one branching downstream after the reforming device to be able to provide the reformed secondary fuel as a reducing agent to an exhaust aftertreatment system, with the secondary fuel being able to be provided to the exhaust aftertreatment system directly by the reforming device and/or from the secondary fuel store.

16. A method for the fuel supply of an internal combustion engine from a primary fuel tank, wherein chemically untreated primary fuel is supplied to the internal combustion engine as a main fuel and a portion of available primary fuel is reformed by means of a reforming device into a secondary fuel that is supplied to the internal combustion engine as a pilot fuel to an active prechamber of the internal combustion engine,
    wherein a secondary fuel store for storing the reformed secondary fuel is provided and/or at least one compressor/pump is included downstream after the reforming device to be able to supply the reformed secondary fuel at an elevated pressure to at least one of the internal combustion engine, the secondary fuel store, and an exhaust aftertreatment device, and
    wherein the second fuel path has at least one branching downstream after the reforming device to be able to provide the reformed secondary fuel as a reducing agent to an exhaust aftertreatment system, with the secondary fuel being able to be provided to the exhaust aftertreatment system directly by the reforming device and/or from the secondary fuel store.

17. The method in accordance with claim 16, wherein the admixture rate of the secondary fuel to the primary fuel to be supplied into the combustion chamber is changed during engine operation, an admixture rate optimal in dependence on an operating situation being determined on the basis of a parameterization and/or modeling stored in a control unit and being implemented in a technical control and/or regulation manner.

18. The method in accordance with claim 17, wherein the optimum admixture rate is determined in dependence on a current operating situation of the combustion process of the internal combustion engine and/or of an exhaust aftertreatment device and/or the quality of the primary fuel.

* * * * *